R. H. BÖHLING.
METHOD AND DEVICE FOR MANUFACTURING PIPE BENDS, SERPENTINES, AND THE LIKE.
APPLICATION FILED JULY 16, 1917.
1,353,714.  Patented Sept. 21, 1920.
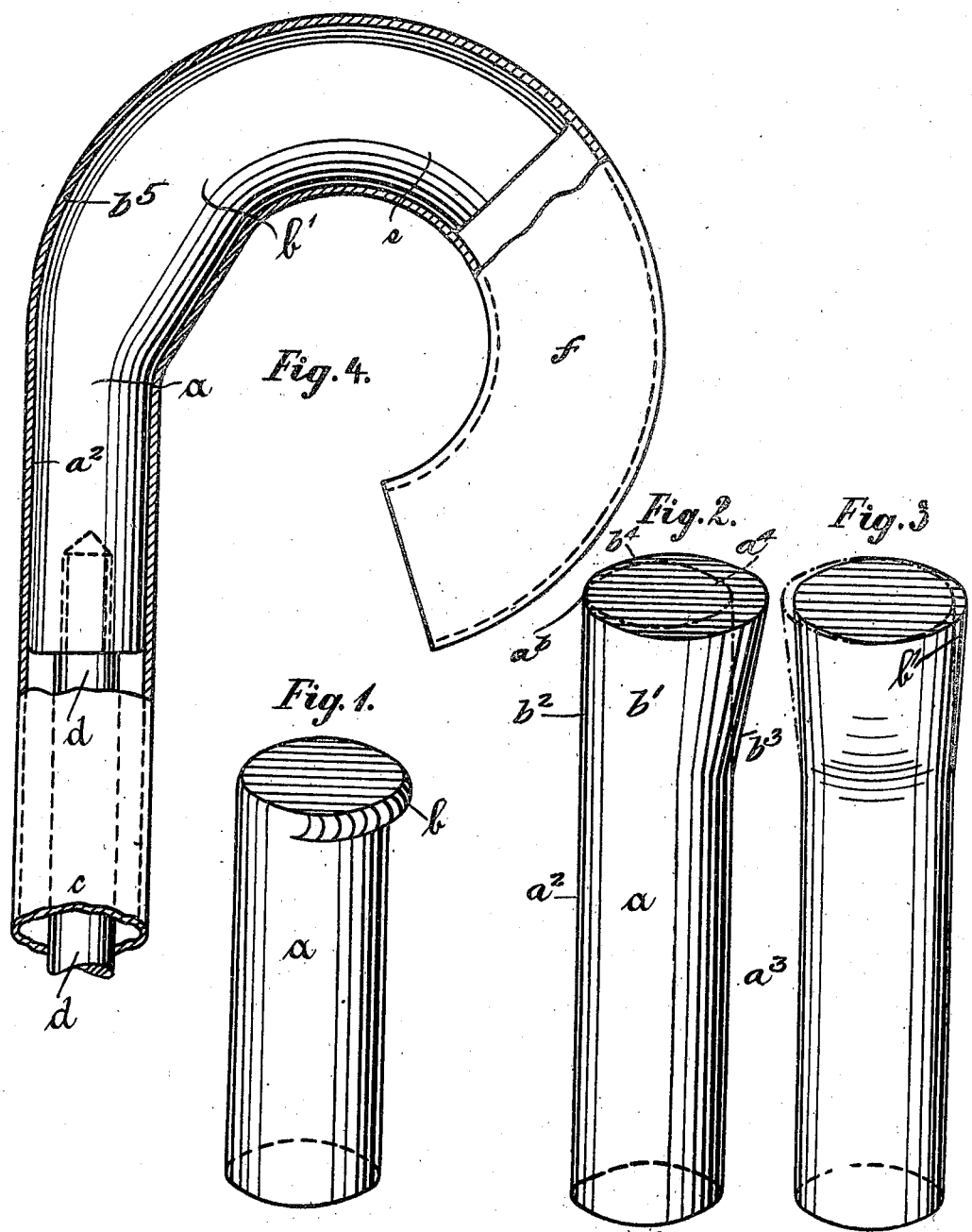
Inventor
Rudolf Hieronymus Böhling
By [signature] Atty.

UNITED STATES PATENT OFFICE.

RUDOLF HIERONYMUS BÖHLING, OF HAMBURG, GERMANY, ASSIGNOR TO THE FIRM ROHRBOGENWERK G. M. B. H., OF HAMBURG, GERMANY.

METHOD AND DEVICE FOR MANUFACTURING PIPE-BENDS, SERPENTINES, AND THE LIKE.

1,353,714.  Specification of Letters Patent.  Patented Sept. 21, 1920.

Application filed July 16, 1917. Serial No. 180,926.

*To all whom it may concern:*

Be it known that I, RUDOLF HIERONYMUS BÖHLING, citizen of Hamburg, in the German Empire, residing at Hamburg, Germany, have invented certain new and useful Improvements in Methods and Devices for Manufacturing Pipe - Bends, Serpentines, and the like, of which the following is a specification.

In manufacturing pipe bends from pipes, tubes and the like heretofore the pipes or tubes were filled with sand or similar material and then bent about a curved block, the curvature of which corresponds to the inner radius, to which the pipe is to be bent. Another method consisted therein that a mandrel was used, which corresponds in thickness to the inner diameter of the tube and which itself is curved to the radius of the bend that is to be produced. These methods however can only be used to a very limited extent, that is to say, they are not applicable for producing bends of small radius of curvature or for producing bends from pipes with large diameter and moreover they can be only advantageously used, when the pipe is made of soft metal, for instance lead or copper. In both instances the material is shrunk or upset on the inner part of the bend and stretched on the outer part. When the pipe is very sharply bent, that is to say, about a very small radius, it will be impossible to avoid the creation of folds and the stretching of the material on the outer part weakens the wall too much. The said methods are even less applicable, when bends are to be made from pipes having comparatively thin walls.

The object of the present invention is mainly, to produce bends of any desired radius and any desired diameter of piping. A particular advantage consists in the fact that bent pipes having walls of the same thickness throughout can be produced. In carrying out the method, the pipe is expanded with regard to diameter and this expansion will account for the surplus material that exists at the inner part of the bend.

In using this surplus of material for increasing the diameter of the bent pipe at the same time the surplus material is partly dislodged from its place and distributed about the pipe somewhat toward the outer side.

According to the present invention it is possible to produce from a thin straight pipe a bend of larger diameter and having uniform thickness throughout. The distribution of the material is a consequence of upsetting of the surplus material and at the same time a drawing action taking place transversally to the axis of the pipe and causing expansion originated by a forward feeding motion. This shrinking or upsetting action is strongest on the innermost part of the bend and will decrease gradually toward the outer part.

In carrying out the said method, a draw mandrel is used, consisting of a guiding shaft provided on one side with a lateral projection or shoulder. By means of this projection the pipe fed over the mandrel will be laterally expanded and bent toward the expanding side, whereby the surplus of material will be moved from its place to a greater or less extent.

In the drawing the Figures 1 and 2 show two different forms of construction of a mandrel used according to the present invention. Fig. 3 is an elevation of the mandrel shown in Fig. 2 turned at right angles and Fig. 4 is a sectional elevation of a further improved mandrel in connection with a blank pipe curved partly to the form of a bend or serpentine.

In the mandrel shown in Fig. 1 the guiding shaft $a$ is provided on one end with a one-sided lateral bead $b$. In the construction shown in Figs. 2 and 3 the mandrel is also provided with a lateral projection, which however here has the shape of a horse's hoof ($b'$).

The mandrel shown in Fig. 4 has also a part $b'$, shaped similarly to a hoof. The shaft $a$ is carried by a rod $d$, which is used for pulling the mandrel through the pipe $c$. Of course either the rod $d$ carrying the mandrel may be moved and the pipe $c$ held stationary or the rod $d$ may be fastened to a fixed part and the pipe $c$ may be moved on forward. The rear end portion $b'$ of the mandrel has the form of a frustum of a cone and is eccentric to the cylindrical shaft $a$, one element $b^2$ of said frustum being a continuation of the same element $a^2$ of the cylindrical shaft $a$, while one element $b^3$ of the frustum extends at an angle to the element $a^3$ of the shaft $a$. In other words this portion $b'$ is hoof-shaped and if the shaft were continued through it, as indicated by the dotted line circle $a^4$, this circle and the periphery $b^4$of the end of the portion $b'$ would be tangent to one another as shown at $a^b$.

The diameter of the hoof-shaped portion $b'$ at its end $b^4$ corresponds to the inner diameter of the finally bent pipe $f$, shown in Fig. 4 and said portion $b'$ gradually diminishes in diameter and merges into the cylindrical shaft $a$. If desired, a partly ringshaped cylinder $e$ may be provided for as a prolongation of the conical part $b'$, having a diameter also corresponding to the inner diameter of the bend and bent itself to the same curvature as the bend.

Owing to the element $b^3$ of the part $b'$ diverging from the element $b^2$, the material of the forward fed blank will be stretched transversally and thus expanded in diameter, while that part of the pipe, which is next to the element $b^2$ of the part $b'$ will be solely drawn against it to contact therewith. The element $b^3$ of the part $b'$ will of course proffer some resistance against the forward feeding of the pipe and consequently an upsetting of the material to be stretched takes place in such manner that the material is partly removed from its place in the progress of diameter increasing, being so distributed that the thickness of the wall of the pipe will be equal throughout. The partly ringshaped prolongation $e$ will warrant the exact curvation of the bend and will also serve as a guide for it.

When it is desired to produce a spirally shaped serpentine, a draw mandrel is used, in which the element $b^2$ of the conical part $b'$ is itself curved corresponding to a spiral line $b^5$ shown in Fig. 4 merging into the element $a^2$ of the shaft $a$, thus the part $b'$ will be turned out from the plane, in which it starts from the shaft $a$ and form an oblique prolongation eccentrically to the shaft $a$.

In producing the bend or in dimensioning the draw mandrel, the radius of curvature and the inner diameter of the straight pipe to be used must be drawn into consideration.

If it is not the aim to obtain an equal thickness of the wall throughout, for instance, if the wall on the inner side of curvature is to be thicker or thinner and therefore in operation the surplus of material is to be used merely to a smaller or even to a greater extent for expansion, the diameter of the straight pipe will be chosen greater or smaller respectively.

The new mandrel is not only applicable for pipes of soft material (lead, copper), but also for pipes of iron or steel in any thickness of the wall and can be carried out cold, if sufficiently ductile. When heat is applied, the power and the time requisite for the operation will be considerably reduced. The method enables the manufacture of bends of extremely small radius of curvature and large diameter of pipe. It moreover also enables the manufacture of a continuous spiral pipe or serpentine with large diameter and small radius of curvature.

I claim:

1. The method of manufacturing pipe bends, serpentines, and the like, which consists in drawing a pipe blank over a mandrel adapted to simultaneously bend and expand the material eccentrically to its longitudinal axis.

2. The method of manufacturing pipe bends, serpentines and the like, which consists in drawing the pipe over a cylindrical mandrel of the same diameter as the inner diameter of the pipe and over an eccentric projection on the mandrel, whereby the pipe is simultaneously bent and expanded in diameter in a lateral direction only.

3. A draw mandrel for use in manufacturing pipe bends, serpentines and the like from a straight pipe or tube, consisting of a cylindrical body, having a projection eccentric to the axis of said cylindrical body at one end and adapted to urge the material of the pipe blank to one side and simultaneously bend the pipe, when the mandrel is drawn through the blank.

4. A draw mandrel for use in manufacturing pipe bends, serpentines and the like from a straight pipe or tube, consisting of a cylindrical body, and a one-sided projection attached to the said cylindrical body at one end and shaped similarly to a horse's hoof, the diameter of which starting from the cylindrical body gradually increases.

5. A draw mandrel for use in manufacturing pipe bends, serpentines and the like from a straight pipe or tube, consisting of a cylindrical body, and a one-sided projection attached to the said cylindrical body at one end and shaped similarly to a horse's hoof, the diameter of which, starting from the cylindrical body gradually increases, an element of said projection being curved lengthwise to a radius corresponding to that of the inner wall of the outer part of the desired bend.

6. A draw mandrel for use in manufacturing pipe bends, serpentines and the like from a straight pipe or tube, consisting of a cylindrical body, a one-sided projection attached to the said cylindrical body at one end and forming together with said end an approximate frustum of a cone, shaped similarly to a horse's hoof, the diameter of which starting from the cylindrical body gradually increases and being so shaped that the center line is curved in the shape of a spiral.

7. A draw mandrel for use in manufacturing pipe bends, serpentines and the like from a straight pipe or tube consisting of a cylindrical body, having a projection eccentric to the axis of said cylindrical body at one end and adapted to urge the material of the pipe blank to one side, when the mandrel is drawn through the blank, and a prolongation at the end of the said body, curved to form the desired bend and of a diameter equal to the diameter of such bend.

RUDOLF HIERONYMUS BÖHLING.

Witnesses:
F. A. MAX KAEMPFF,
I. CHRIST. HAFERMANN.